March 26, 1963  J. M. HOLLAND  3,082,710
FOODSTUFFS BAKING APPARATUS
Filed June 22, 1959  2 Sheets-Sheet 1
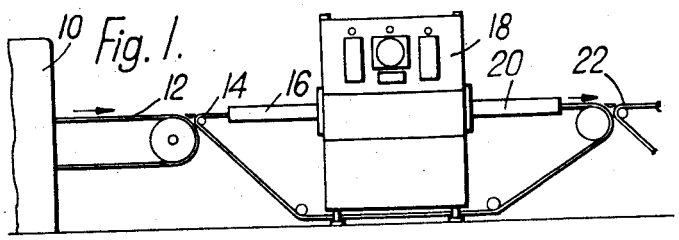
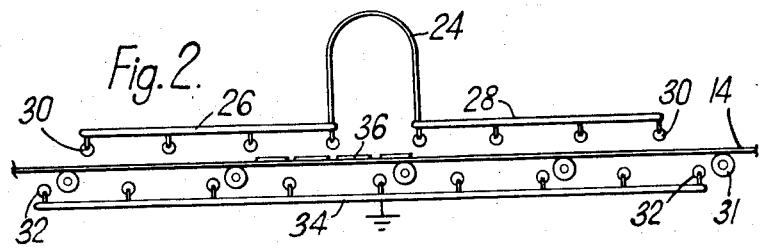
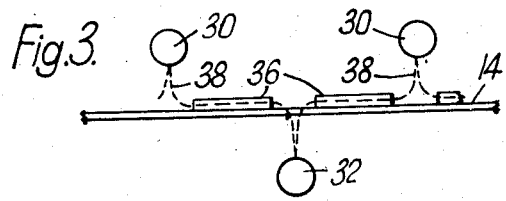
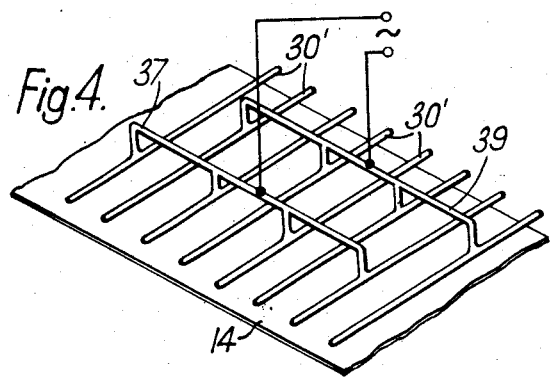
Inventor
John M. Holland
By Ralph B. Stewart
Attorney March 26, 1963 J. M. HOLLAND 3,082,710
FOODSTUFFS BAKING APPARATUS Filed June 22, 1959 2 Sheets-Sheet 2

Inventor
John M. Holland
By Ralph B. Stewart
Attorney

United States Patent Office 3,082,710
Patented Mar. 26, 1963

3,082,710
FOODSTUFFS BAKING APPARATUS
John Michael Holland, Warlingham, Surrey, England, assignor to Radio Heaters Limited, Wokingham, England, a British company
Filed June 22, 1959, Ser. No. 821,751
Claims priority, application Great Britain June 24, 1958
11 Claims. (Cl. 107—54)

This invention relates to the baking of articles of the kind including biscuits of all types, including flat thin cakes sometimes known as biscuits, crispbreads, rusks of all types, biscottes and similar products, by a combination of conventional heating means and radio-frequency dielectric heating means, the expression "conventional heating means" being intended to indicate one in which baking is effected by heat transfer, either by radiation, conduction, free convection or forced draught. Dielectric heating enables the interior of the biscuit or other article to be cooked in a greatly reduced time because the heat is produced within the article itself, and throughout the whole of the article, and the conventional heating provides the browning of the outside of the article.

Preheating by radio-frequency dielectric heating, which has been carried out successfully with some foodstuffs, is not suitable for biscuits because such preheating causes bubbles in the dough which cause locally increased heating and which lead to a rough surface appearance on the finished product. Also, in the case of biscuits with a high fat content, preheating in a dielectric heating oven causes the fat to melt and run out if the outer skin of the biscuit has not been previously sealed. Most of the experimental apparatus built hitherto therefore provided simultaneous radio-frequency and conventional heating in a single oven. However, the use of a single oven for both purposes has also proved very unsatisfactory because experience has shown that the results obtained from such apparatus tend to deteriorate rapidly with use. It is believed that the causes of this are the oxidation of the surface of the steel from which the inner lining of the oven has been made, causing increased high frequency resistance; the increase with age of the high frequency resistance of wire mesh conveyor bands in conveyor ovens, due to oxidation; and the loosening of bolts at the joints between sections of panels of the oven with resulting severe radio-frequency heat losses and increased interference radiation.

As an example of the magnitude of the resulting heat losses, in one apparatus in which the radio-frequency heat losses in the framework of the oven and the steel band were initially only 15% of the total radio frequency heat generated, the losses had risen to over 60% after use for six months. The interference radiation had also increased to a level which is generally regarded as unacceptable and contravenes existing statutory regulations in some countries. In addition, the radio-frequency electrodes materially affect the transfer of heat to the biscuits or other articles by conventional heating methods. It seems, therefore, that in a combined radio-frequency and conventional heating oven, neither the radio-frequency nor the conventional heating section can operate under conditions of maximum efficiency.

We have found that the setting of the outsides of the articles, and the browning, if required, can be successfully carried out by conventional heating means at a much greater temperature than is usual and in a correspondingly shorter time. However, if this is done there is insufficient time for the heat to "soak through" to cook the inside of the article.

According to the present invention, an article to be baked is heated in a conventional baking oven and then, with the interior of the article still incompletely baked or having a higher moisture content than normal, is transferred to a dielectric heating oven, the direction of the electric field in the latter oven and the arrangement of the article between the electrodes of the dielectric heating oven being such that a substantial component of the electric field extends along the incompletely baked or moist interior of the article. As an example, in the case of a biscuit or other article having substantially parallel top and bottom surfaces, there is a strong component of the electric field lying roughly parallel to the plane of the top and bottom surfaces. This is contrary to the result which would be obtained if the articles lay between flat electrodes of the standard kind in the dielectric oven, when the electric field would pass across the moist interior of the article.

The use of dielectric heating after the setting of the outsides of the articles enables the insides to be cooked rapidly without leading to the rough surface appearance produced by preheating in a radio-frequency electric field, or allows rapid drying of the insides of the articles if they are already substantially cooked through. Moreover, it allow the radio-frequency heating oven to be separated from the conventional heating oven, and so allows both to be designed for optimum performance. However, we have found that it is not sufficient merely to convey the articles between electrodes in a dielectric heating oven. We have found by experiment that when biscuits which have been partially cooked or baked are placed between and parallel to conventional flat electrodes, so that the radio-frequency field passes vertically through the smallest dimension of the biscuits, those sections which have been already fully baked tend to heat somewhat more readily than the unbaked and more moist centre layer. This results in such a strong tendency for burnt spots to be produced by localized runaway heating that the process will not produce a commercially saleable product under practical conditions. Unexpectedly, however, heating each article by passing the dielectric field longitudinally through the moist interior, as defined above, reverses this tendency so that the moist centre layer heats in preference to the already baked sections. This greatly reduces the tendency for the already dried or baked sections to overheat and burn. The process is thus rendered non-critical and becomes practical for everyday use. It will be seen that with the method according to the invention, the conventional heating system gives preferential heating of the outside of the biscuits or other articles and the dielectric heating system as defined gives preferential heating of the moist inside layer.

Thus, in the method according to the invention, dielectric heating is not used to provide a uniform heating of the articles, as is usually the case, but instead is used in such a manner that it produces an uneven heating of the article, the unevenness being such that to some extent it compensates for the unevenness of the prior heating in the conventional oven. The two methods of heating are thus complementary. Without the electric field arrangement defined, the drying of the exterior of the article produced by the conventional heating system would lead to increased dielectric heating of the dried parts, causing localized burnt spots.

The electric field can be made to pass in the required direction through the biscuit or other article to be baked by using a staggered arrangement of electrodes, that is to say, an arrangement in which co-operating electrodes are spaced in a direction parallel to the plane of the conveyor on which the article is lying. As will be later explained, the lines of force which pass through the article then have a strong horizontal component passing through the moist centre plane of the article. Alternatively, the biscuits can be stacked on leaving the conventional heating oven so that they are standing on end either vertically or obliquely when they pass between the electrodes, which may then be flat plates. Stacking has the advantage that, owing to the increase in bulk of material to be heated in a given length of the electrode system, the power supplied to the electrodes can be increased and the duration of the dielectric heating process to which individual biscuits are subjected can be increased, as the same number of biscuits can be handled at a far lower band speed. This enables a reduction in the length of the dielectric heating oven, which is an important consideration when this oven has to be added to a conventional heating oven in a building designed only for the latter. As an example, if the conveyor band is travelling at 30 feet per minute and the required duration of the dielectric heating operation is from 40 to 60 seconds (with the biscuits lying flat on the band) the length of the dielectric heating oven must be from 20 to 30 feet. When the biscuits are stacked on edge, it may be possible to reduce this length to as little as 4 or 5 feet. Once the surface has been set by conventional heating means, the reduction in total baking time made possible by the use of high frequency heating is normally limited by the temperature at which the lowest parts of the surface pattern can be browned or caramelized in the normal baking oven without the pattern crests being excessively caramelized.

In tests on biscuit-baking apparatus we have found that the time required to cook the biscuits by conventional heating means alone can be reduced to between one-third and two-thirds by the use of the method according to the invention. In addition, the period required for drying the baked articles is reduced to a fraction of that required when the articles are dried out without dielectric heating.

In order that the invention may be better understood several embodiments thereof will now be described with reference to the accompanying drawings, in which:

FIGURE 1 shows diagrammatically a part of a biscuit baking system;

FIGURE 2 shows the arrangement of rod electrodes in the dielectric heating oven of FIGURE 1;

FIGURE 3 shows the direction of the electric field in biscuits passing through the dielectric heating oven;

FIGURES 4 and 5 show alternative arrangements of rod electrodes in the dielectric heating oven;

Figure 5:
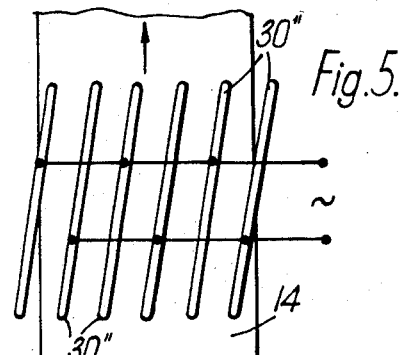

In the example shown in FIGURE 1, biscuits pass through a baking oven 10 employing forced-draught heating on a steel oven conveyor 12. On emerging from the oven 10, the biscuits are transferred to a fabric belt conveyor 14, which may advantageously be made of a polyester fibre, for example, "Terylene," on which they pass through an interference suppression and safety tunnel 16 and into a dielectric heating oven 18. They emerge from the dielectric heating oven through another safety tunnel 20 and are transferred to a cooling conveyor 22 of a conventional kind.

Within the dielectric heating oven 18 the output coil 24 of a conventional high-frequency electric wave generator (FIGURE 2) has its two ends connected to two electrode units 26 and 28 which constitute a balanced electrode system. The coil 24 may be a single-turn or open-loop coil, as shown, which supplies equal and opposite alternating potentials to the two electrode units. Each of these electrode units is electrically connected to four parallel rod electrodes 30 above the conveyor belt 14, which runs on skid bars 31 made of polytetrafluoroethylene. Each of the rod electrodes runs the whole width of the conveyor, and they are spaced from each other in the direction of movement of the belt 14. Under the belt 14 there is a further set of rod electrodes 32 which are connected through the plate 34 to the frame of the apparatus. The rods 32 are parallel to the rods 30 and are staggered with respect to the latter rods, so that each rod 30 lies midway between two adjacent rods 32. Each rod 30 cooperates with two of the rods 32, and the effect of this is shown in FIGURE 3. When biscuits 36 are travelling between the electrodes, the lines of force represented by the dotted lines 38 tend to travel downwards from the electrode 30 to the edge of the biscuit, then horizontally through the middle of the biscuit, and then downwards to the electrode 32.

It is found that with the lines of electric force travelling along the moist centre of the biscuit in this way, selective heating of the uncooked interior of the biscuit is obtained. In addition less baking time is required than when flat electrodes are used as a greater proportion of the total heat is produced directly within the moist centre layer of the biscuit, where it is required.

In the alternative arrangement of the electrodes shown in FIGURE 4, the earthed rods below the belt are omitted and parallel rod electrodes 30' above the conveyor belt are connected alternately by way of conductors 37 and 39 to the two output terminals of the radio frequency generator, which are in turn connected to the two ends of an output coil. The lines of electric force from each rod then travel down to a biscuit lying on the belt 14, then along the biscuit through its moist centre and finally up again to meet the next rod electrode. In a further alternative, the electrodes 30' are arranged as shown in FIGURE 4, but are located below the conveyor belt 14.

The rod electrodes 30'' may also be arranged roughly parallel to the direction of movement of the conveyor belt. They should, however, make a small angle with the latter direction, as shown in FIGURE 5, to minimize the risk of uneven heating across the width of the belt. In this embodiment also the electrodes are connected alternately to the two ends of the output coil.

Figure 6:
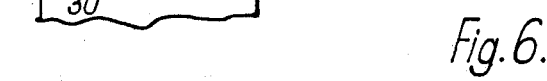
FIGURES 6 and 7 show two ways in which biscuits passing between flat electrodes in the dielectric heating oven can be stacked.
Figure 7:
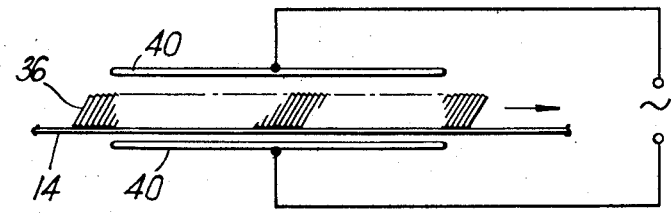
Figure 8:
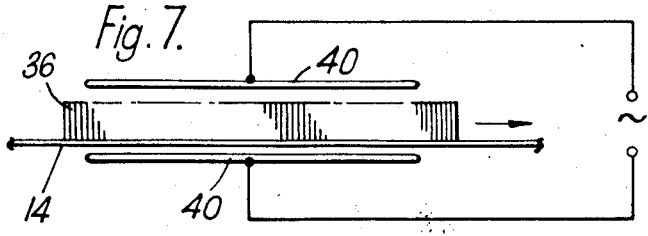
FIGURE 8 shows diagrammatically a method of stacking the biscuits before they enter the dielectric heating oven.

In an alternative arrangement, flat electrodes 40 (FIGURES 6 and 7) are used in place of the rod electrodes shown in FIGURES 2 and 3, and the biscuits 36 in the dielectric heating oven are stacked on end, either vertically as in FIGURE 7 or obliquely as in FIGURE 6. With each of these arrangements, the electric field between the electrodes tends to pass through the moist centre of the biscuit in a plane parallel to the major surfaces of the biscuit. As an example of one such arrangement, the biscuits 36 leave the first oven 10 (FIGURE 1) on a fast conveyor 42 (FIGURE 8), at the end of which they pass over a fixed transfer plane 44 to a slow conveyor 46. The change of conveyor speed causes the biscuits to stack themselves on end obliquely as shown in FIGURE 8.

As examples of the results obtained by the method according to the invention, shortcake biscuits which were previously baked for 11½ minutes at 390° F. in a conventional baking oven were baked and dried to the same extent by a period of 6½ minutes at 510° F. in the conventional oven followed by 5 seconds in the dielectric heating oven, without loss of quality. Dog biscuits which were previously baked for 20 minutes at 400° F. were found to be improved in quality when the period in the conventional oven was reduced to 10 minutes at a temperature between 450° F. and 475° F., followed by a period of 30 seconds in the dielectric heating oven.

Although in the apparatus described above the biscuits are transferred from the steel conveyor 12 to the canvas belt 14, if desired a single canvas conveyor 12 can be used to pass the biscuits through both the oven 10 and the oven 18, in cases in which the latter oven uses the staggered electrode arrangement of FIGURES 2-5 and the same conveyor speed can be used in both ovens.

When biscuits are being baked, they are transferred from the oven 10 to the dielectric heating oven when the outside is set and has a satisfactory appearance but before the centre of the biscuit is fully baked. In the case of sausage rusks, which are preferably dried without any browning, the rusks are transferred to the dielectric heating oven when the outside is set but before browning can take place.

The final dielectric heating oven 18 may complete the drying of the biscuit or other product as well as completing the cooking of the inside of the product. With some biscuits it is found that some final browning or caramelizing of the biscuit throughout its thickness is necessary. This is achieved by carrying on the radio frequency heating in the dielectric heating oven for a short period after the moisture content has been removed to the desired extent.

When the staggered electrode arrangement of FIGURE 2 is used it may be found desirable to increase the voltages on the second half of the electrode system in order to caramelize the biscuits after they have been dried to the required extent.

I claim:

1. Apparatus for baking articles of the kind described having a thickness substantially less than their extension in at least one direction perpendicular to the thickness, including a baking oven operating by a heat transfer process, an oven of the kind employing dielectric heating, and transporting means arranged to convey articles for baking from said baking oven to said dielectric heating oven, said dielectric heating oven including a horizontal conveyor and two sets of electrode bars arranged in a staggered formation so that co-operating electrodes are horizontally displaced in each set relative to the electrodes in the other set, whereby when an article to be baked lies on the conveyor in operative relationship with two co-operating electrodes a substantial component of the electric field passes along the moist interior of the article in a direction perpendicular to the thickness of the article.

2. Apparatus according to claim 1, in which one set of electrode bars is arranged above said conveyor and the other set below said conveyor.

3. Apparatus according to claim 1, in which the two sets of electrode bars are arranged above said conveyor, so that the articles for baking pass alternately under bars of the two sets, said dielectric heating oven including a radio frequency generator, having two output terminals connected respectively to said two sets of electrode bars.

4. Apparatus according to claim 1, in which the two sets of electrode bars are arranged below said conveyor, so that the articles for baking pass alternately above bars of the two sets, said dielectric heating oven including a radio frequency generator having two output terminals connected respectively to said two sets of electrode bars.

5. Apparatus according to claim 1, in which said electrode bars are substantially perpendicular to the direction of movement of said conveyor.

6. Apparatus according to claim 1, in which said electrode bars are inclined at a small angle to the direction of movement of said conveyor.

7. A method of baking substantially flat articles of the kind described which has substantially parallel top and bottom surfaces, which method comprises in a first zone partially baking the article by heat transfer sufficient to substantially fully bake the outside of the article, removing the article from said first zone while its interior is still incompletely baked, transferring said partially baked article to a second zone and therein completing the baking of the article by radio frequency dielectric heating in an electric field extending in a path which passes substantially parallel to the planes of the top and bottom surfaces of the article and through its incompletely baked interior.

8. A method according to claim 7 wherein said articles are passed through said second zone with their major axis substantially horizontal and said radio-frequency electric field is generated by two sets of electrode bars in staggered arrangement so that co-operating electrode bars are spaced in a direction parallel to the horizontal path of travel of said articles producing a strong electric field component in said articles parallel to the major axis of the articles.

9. A method according to claim 7 wherein said articles are passed through said second zone along a substantially horizontal path with their major axis substantially horizontal and said radio-frequency electric field is developed along said path between a first electrode means located above said path and a second electrode means located beneath said path, said first electrode means being horizontally displaced relative to the second electrode means whereby a strong electric field component parallel to said path is produced in the plane of the locus of the major axes of said articles.

10. A method according to claim 7 wherein said articles are passed through said second zone along a substantially horizontal path with their cross-section of greatest area approximately normal to said path and said radio-frequency electric field is developed along said path between a first electrode means located above said path and a second electrode means located beneath said path, said first and second electrode means comprising parallel electrode elements coextensive with one another in planes normal to said path of travel whereby a strong electric field component normal to said path is maintained within said second zone.

11. Apparatus for baking articles of the kind described, including a baking oven operating by a heat transfer process, an oven of the kind employing dielectric heating, and transporting means arranged to convey articles for baking from said baking oven to said dielectric heating oven, said dielectric heating oven including a horizontal conveyor and two sets of electrode bars, one set above and one set below said conveyor, arranged in a staggered formation so that cooperating electrodes are horizontally displaced in each set relative to the electrodes in the other set, the said set of electrode bars above the conveyor comprising two groups of bar electrodes under which the articles pass successively, said dielectric heating oven including a pair of electrical output terminals which provide alternating equal and opposite electrical potentials to which the two groups of electrode bars above the conveyor are connected, respectively, the said group of electrode bars below said conveyor being connected to a point of steady electric potential.

References Cited in the file of this patent

UNITED STATES PATENTS

| | | |
|---|---|---|
| 685,671 | Burbank | Oct. 29, 1901 |
| 1,592,414 | Aydelotte | July 13, 1926 |
| 2,454,370 | Beaubien | Nov. 23, 1948 |
| 2,491,687 | Nutt | Dec. 20, 1949 |
| 2,512,311 | Davis | June 20, 1950 |
| 2,871,332 | Northmore et al. | Jan. 27, 1959 |
| 2,942,562 | Luc | June 28, 1960 |